(12) United States Patent
Jacobson et al.

(10) Patent No.: US 9,645,839 B2
(45) Date of Patent: May 9, 2017

(54) STATEFUL APPLICATIONS OPERATING IN A STATELESS CLOUD COMPUTING ENVIRONMENT

(75) Inventors: Neil A. Jacobson, Acton, MA (US); Kristofer H. Reierson, Acton, MA (US); Andrew Montgomery, Lexington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 452 days.

(21) Appl. No.: 12/912,798

(22) Filed: Oct. 27, 2010

(65) Prior Publication Data
US 2012/0110570 A1    May 3, 2012

(51) Int. Cl.
*G06F 9/455* (2006.01)

(52) U.S. Cl.
CPC ................ *G06F 9/45533* (2013.01)

(58) Field of Classification Search
None
See application file for complete search history.

(56) References Cited

U.S. PATENT DOCUMENTS

| 2008/0082693 | A1* | 4/2008 | Meijer ............... H04L 41/50 709/247 |
| 2009/0089860 | A1* | 4/2009 | Forrester ............ H04L 63/12 726/3 |
| 2009/0182955 | A1 | 7/2009 | Cherukuri |
| 2009/0300149 | A1 | 12/2009 | Ferris et al. |
| 2009/0328040 | A1* | 12/2009 | Miller et al. .................. 8/100 |
| 2010/0042670 | A1 | 2/2010 | Kamalakantha et al. |
| 2010/0064033 | A1 | 3/2010 | Travostino et al. |
| 2010/0070978 | A1* | 3/2010 | Chawla ............... G06F 9/5077 718/105 |
| 2010/0115490 | A1 | 5/2010 | Wilcock et al. |
| 2010/0198788 | A1 | 8/2010 | Sim-Tang et al. |
| 2011/0055714 | A1* | 3/2011 | Vemulapalli et al. ........ 715/739 |
| 2011/0093847 | A1* | 4/2011 | Shah .................. G06F 9/45558 718/1 |

(Continued)

FOREIGN PATENT DOCUMENTS

| WO | 2009/043029 A2 | 4/2009 |
| WO | 2010110788 A1 | 9/2010 |

OTHER PUBLICATIONS

"Cloud Tools Command Line Framework", Retrieved at <<http://www.gigaspaces.com/wiki/display/CCF/Cloud+Tools+Command+Line+Framework >>, Retrieved Date: Sep. 21, 2010, pp. 3.

(Continued)

*Primary Examiner* — Dong Kim
(74) *Attorney, Agent, or Firm* — Workman Nydegger

(57) ABSTRACT

A cloud computing environment may use a virtualization layer within a stateless cloud computing process to capture, store, and retrieve state information generated by a stateful application executing within the process. The virtualization layer may monitor various state storage systems to identify changes to stateful items and store the stateful items in a state storage mechanism. The virtualization layer may intercept and redirect calls to the stateful items stored in the state storage mechanism. A cloud computing manager may start and stop the stateless cloud computing process, and may recover the state and resume executing the application.

20 Claims, 3 Drawing Sheets

(56) References Cited

U.S. PATENT DOCUMENTS

| | | | | |
|---|---|---|---|---|
| 2011/0126275 | A1* | 5/2011 | Anderson | H04L 9/3213 726/8 |
| 2011/0302297 | A1* | 12/2011 | Kruglick | 709/224 |
| 2012/0017114 | A1* | 1/2012 | Timashev et al. | 714/15 |
| 2012/0084355 | A1* | 4/2012 | Locker et al. | 709/204 |

OTHER PUBLICATIONS

"Client/Server on Web @ fraction of the cost", Retrieved at <<http://www.visualwebgui.com/tabid/658/Default.aspx>>, Retrieved Date: Sep. 20, 2010, pp. 1.

Kommalapati, Hanu., "Windows Azure Platform for Enterprises", Retrieved at <<http://msdn.microsoft.com/en-us/magazine/ee309870.aspx >>, Retrieved Date: Sep. 20, 2010, pp. 17.

Walberg, Sean A., "Migrate your Linux application to the Amazon cloud, Part 1: Initial migration", Retrieved at <<http://www.ibm.com/developerworks/linux/library/l-migrate2cloud-1/?ca=drs- >>, Jul. 13, 2010, pp. 16.

Mallya, Subraya., "Graduating Cloud to the Enterprise: Platform-as-a-Service", Retrieved at <<http://www.prudentcloud.com/cloud-computing-technology/graduating-cloud-to-the-enterprise-platform-as-a-service-25012010/ >>, Jan. 25, 2010, pp. 10.

"International Search Report", Mailed Date: Apr. 10, 2012, Application No. PCT/US2011/053531, Filed Date: Sep. 27, 2011, pp. 9.

"Search Report Received for European Patent Application No. 11836820.8", Mailed Date: Jun. 5, 2014, 6 Pages.

"First Office Action and Search Report Received for China Patent Application No. 201110354988.8", Mailed Date: Dec. 16, 2013, 11 Pages.

"Second Office Action Received for China Patent Application No. 201110354988.8", Mailed Date: Aug. 19, 2014, 8 Pages.

"Office Action Received for Australia Patent Application No. 2011320899", Mailed Date: Oct. 3, 2014, 3 Pages.

"Third Office Action Received for China Patent Application No. 201110354988.8", Mailed Date: Feb. 2, 2015, 6 Pages.

* cited by examiner

STATEFUL APPLICATIONS OPERATING IN A STATELESS CLOUD COMPUTING ENVIRONMENT

BACKGROUND

Cloud computing is a computing environment in which processes operate statelessly. In a typical cloud computing environment, a user's process may operate on a fabric of hardware platforms within one or more datacenters, and the datacenter operator may be able to move the user's process from one server or hardware platform to another. Since the datacenter operator may perform such moves at different times, the processes executing on the cloud computing environment may not store state within the processes.

In contrast to cloud computing processes, many conventional applications may store state in the form of operating system registry settings, configuration files, and other changes. In order for the application to perform as expected over time, the state for the application may persist and may be recalled from time to time or when the application is restarted.

SUMMARY

A cloud computing environment may use a virtualization layer within a stateless cloud computing process to capture, store, and retrieve state information generated by a stateful application executing within the process. The virtualization layer may monitor various state storage systems to identify changes to stateful items and store the stateful items in a state storage mechanism. The virtualization layer may intercept and redirect calls to the stateful items stored in the state storage mechanism. A cloud computing manager may start and stop the stateless cloud computing process, and may recover the state and resume executing the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
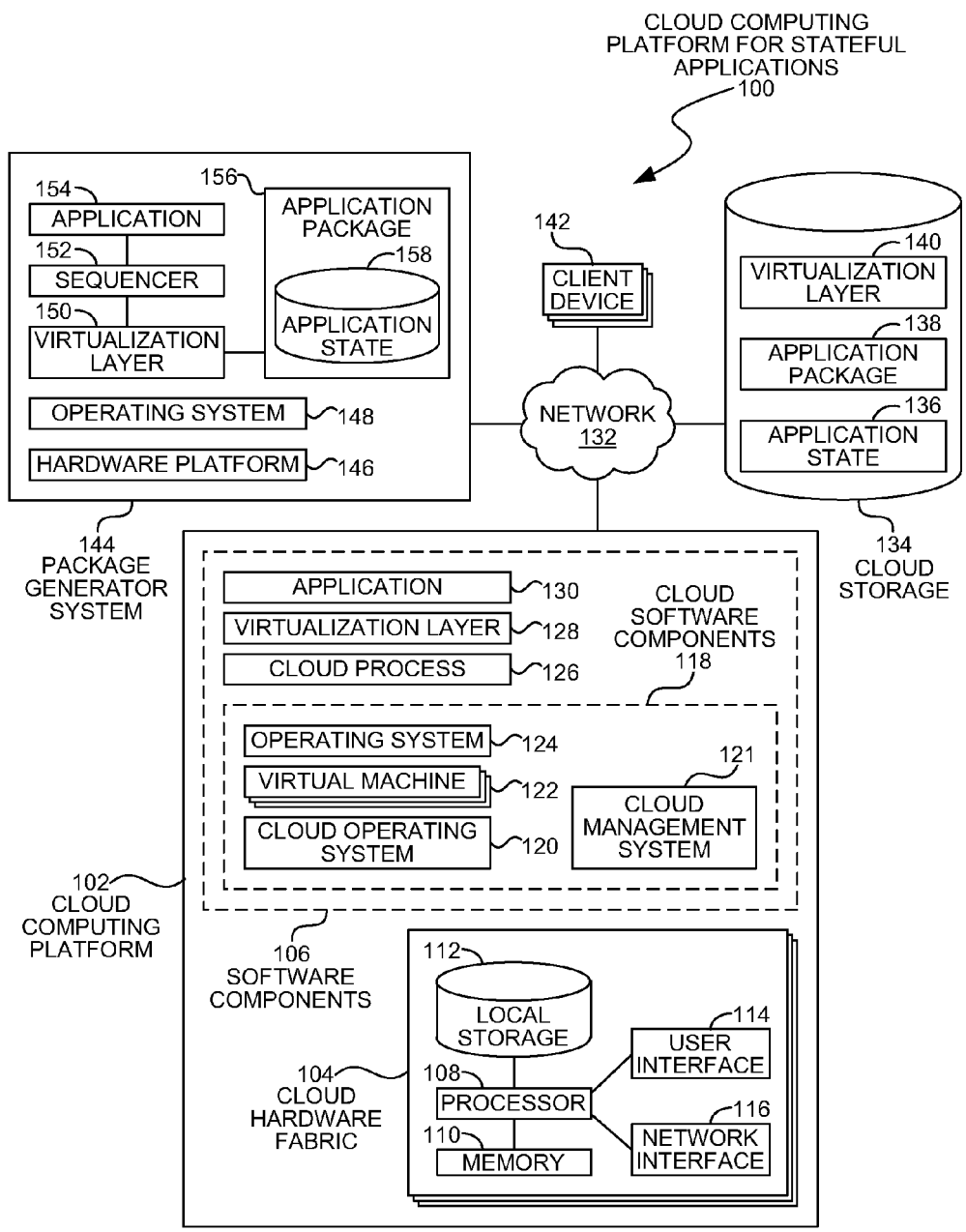
FIG. 1 is a diagram illustration of an embodiment showing a cloud computing environment for stateful applications.

A cloud computing environment may use a virtualization layer to capture state changes to an application and persist the state changes when stopping and restarting the application. The virtualization layer may monitor various storage mechanisms used by applications to store state, and may create and manage a separate storage mechanism for the state. The virtualization layer may recognize calls to the storage mechanisms and redirect such calls to the separate storage mechanism.

The state of the application may be stored into a cloud storage system, which may persist the state while stopping and restarting the application. In many embodiments, a virtual hard disk may be used to store the state, and such a virtual hard disk may be stored directly on a cloud storage system.

In some embodiments, multiple copies of the application may be executing, each having a separate state. When the process executing the application is stopped, the state may be stored, and when the process is resumed, the state may be selected from a group of stored states, the process resumed from the previous state.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a cloud computing environment in which stateful applications may be executed using stateless cloud computing processes. Embodiment 100 is a simplified example of a cloud computing environment and the various components that may allow execution of the stateful application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Many applications, especially conventional desktop or server applications, may be stateful. The term stateful is used to indicate that the application may operate with and change the state of the application during installation and use. In many cases, a stateful application may store configuration information in a system registry, configuration file, configuration database, or other storage mechanism.

In an example of a stateful application, an application may allow a user to customize certain properties or arrange a user interface in a particular manner. Those customizations may constitute the state of the application. In another embodiment, an application may be frequently updated, with each update constituting a state of the application.

In some cloud computing environments, the processes executing in the environment are inherently stateless. In many such embodiments, the processes may execute within a datacenter may be moved from one virtual machine on one hardware platform to another virtual machine on another hardware platform. During such transitions, the datacenter may move the process around, but may not move any state associated with various backend components, such as the hardware platform, a virtual machine, an operating system operating within the virtual machine, or any other component.

Such an architecture may allow the cloud computing environment to manage the underlying hardware and operating systems in a very efficient manner. During periods of low usage, processes may be consolidated onto a small subset of the hardware platforms while other hardware platforms are turned off. When new versions of an operating system are available, or when upgrades or patches are made to an existing operating system, the processes may be temporarily suspended or moved to another hardware platform with an updated operating system, then returned to the original platform and operated with the updated operating system.

Many cloud computing services may host many different computing processes and may provide services for many different customers. Each customer may be responsible for their own processes, but the cloud computing service may provide hardware and software support services. The cloud computing service may manage the processes in large datacenters, which may provide physical security, professional management of the hardware and software infrastructure, high network bandwidth, redundant hardware platforms, and guaranteed uptime, among other benefits.

Some cloud computing environments may operate multiple datacenters which may be located around the world. Such environments may allow users to have their processes and applications executing in different time zones to allow faster connections and lower network costs when providing access to employees or customers around the globe.

Many cloud computing environments may also offer cloud storage. Cloud storage, sometimes also known as blob storage, may be a data storage system that may operate in a datacenter. In many embodiments, cloud storage may provide storage for data and executable code as a service. Such services may manage the hardware and software infrastructure separate from the data storage service, and the user may not be exposed to the hardware and infrastructure. From a user's perspective, the cloud storage system may appear as an infinite sized storage system with high uptime and high reliability.

In order to operate a conventional, stateful application in a stateless process, a virtualization layer may be used to capture all read and write calls to areas where state may be stored, and redirect the calls to a separate state which may be stored in a cloud storage system.

The virtualization layer may operate within a stateful process and may monitor the read and write operations of executable code within an application. In some embodiments, the virtualization layer may be configured to identify certain subsets of the read and write operations as being state-related operations and other operations as not being state-related. For each of the state-related read and write operations, the virtualization layer may redirect the operations to an application state storage object.

For example, a typical stateful application may write changes to an operating system registry or a configuration file. Those write operations may be captured by the virtualization layer and redirected to an application state storage object that may be stored in a cloud storage object.

In some embodiments, the virtualization layer may store the application state storage object on a local storage object accessible by the stateless cloud process. In such embodiments, a cloud process management system may send a command to the virtualization layer when the cloud process may be stopped. The cloud process management system may issue such commands when the process may be moved to another virtual machine or otherwise paused for maintenance or other reasons.

In such an embodiment, the virtualization layer may write any changes from the locally stored application state to an object in cloud storage. Such embodiments may also periodically update the cloud storage object with any changes during normal operations. In other embodiments, the virtualization layer may redirect read and write operations directly to the cloud storage object.

Embodiments where the read and write operations are stored locally and then are copied to the cloud storage object may be useful for stateful applications that perform a large number of frequent accesses to the application state. Such applications may operate slower when the application state may be stored over a network connection to a cloud storage object. Other embodiments where the application may access the application state infrequently may be more suitable for reading and writing directly to the cloud storage object.

In some embodiments, the applications may be loaded and stored in the form of packages. A package may contain all of the various components of an application, including all executable code, executable libraries, and application state. The package may be created by a packaging system that may use the virtualization layer along with a sequencer. The sequencer may identify all of the executable code consumed by the application, including libraries, assemblies, and other components that may or may not be distributed with the application itself. A package may be created that contains the application executables, along with any data files consumed by the application. In some embodiments, the package may include the application state, while in other embodiments, the application state may be stored in a separate storage object.

Embodiment 100 illustrates a cloud computing platform 102 that may have provide stateless cloud processes that may be managed by a user, and various hardware and software infrastructure that may be managed by a cloud computing provider.

The cloud computing platform 102 may have a cloud computing fabric 104 made up of many hardware computing platforms, along with various software components 106.

The cloud computing fabric 104 may consist of many server computers. In some embodiments, a single datacenter may have many hundreds or thousands, or even hundreds of thousands of hardware platforms. The hardware platforms may each have a processor 108, local memory 110, and local storage 112. In some cases, the hardware platforms may have a user interface 114 and network interface 116.

As part of the software components 106, the cloud computing environment 102 may have a set of cloud software components 118. The cloud software components 118 may be managed by the cloud service provider and may not be exposed to a user.

The cloud software components 118 may include a cloud operating system 120 as well as a cloud management system 121. The cloud operating system 120 may operate as a hypervisor to host one or more virtual machines 122 on each hardware platform. Each virtual machine 122 may have an operating system 124 on which stateless cloud processes 126 may execute.

The cloud management system 121 may manage the various components of the cloud computing services. The cloud management system 121 may be capable of performing functions such as moving virtual machines from one hardware platform to another, starting, stopping, and pausing virtual machines, allocating resources to different processes, and performing other management services. The cloud management system 121 may be a system used by a cloud services supplier to update operating systems, upgrade or repair hardware, and otherwise manage the hardware and software within a datacenter.

A cloud process 126 may be exposed to a user so that the user may execute an application within the cloud computing environment 102. The cloud process 126 may be a stateless process and may not be capable of saving and restoring any state information over the lifetime of the process.

A virtualization layer 128 and stateful application 130 may be executed by the stateless cloud process 126. The application 130 may be registered with the virtualization layer 128 so that the virtualization layer 128 may monitor executable code associated with the application 130 to detect and state changes.

In some embodiments, the application 130 may be provided to the cloud computing platform 102 in the form of a package. The package may include the executable code as well as an initial state of the application. The initial state may be the state of the application 130 as initially installed and configured. After the application 130 begins operation, the virtualization layer 128 may create and maintain a second set of state information that may be differences between the initial state and the current state.

In such embodiments, the virtualization layer 128 may include various differencing mechanisms that may identify changes made to the initial state and may store those changes in a separate change database. The differencing mechanism may be able to return the application 130 to a stored state by loading the initial state, then applying the separate change database to re-create the current state.

In some embodiments, the application 130 may be installed and executed without using a package. In such embodiments, a script or other mechanism may first install and execute the virtualization layer 128 on the cloud process 126, then the application 130 may be installed and executed. During the installation process of the application 130, the virtualization layer 128 may redirect read and write operations that may affect the application state into a database or other storage mechanism.

The virtualization layer 128 may store the application state 136 in cloud storage 134, which may be accessed over a network 132.

In some embodiments, the virtualization layer 128 may read and write directly to the cloud storage 134 for each read and write operation to the application state 136. In some such embodiments, the application state 136 may be stored in a virtual hard disk. A virtual hard disk containing the application state 136 may be mounted to the cloud process 126 when the cloud process 126 is started and may provide a simple mechanism by which a virtualization layer 128 may perform read and write operations to the application state 136.

In other embodiments, the virtualization layer 128 may maintain a local application state within the cloud process 126. In such embodiments, the cloud management system 121 may issue a stop command for the cloud process 126, upon receiving such a command, the virtualization layer 128 may write the locally stored application state to the application state 136 stored in the cloud storage 134.

The cloud storage 134 may include an application package 138 as well as an executable virtualization layer 140. In some embodiments, an installer package may contain the virtualization layer's executable components along with an application package. The executable virtualization layer 140 and application package 138 may be loaded into a cloud process 126 when the application 130 is being started. In many embodiments, the loading and execution of the virtualization layer 128 and application 130 may be defined in a script or other executable. In some cases, a user may manually cause the virtualization layer 128 to be loaded and configured, and then may manually load and start the application 130.

The application 130 may be a server application, where various client devices 142 may access the application 130 over a network 132. The network 132 may be a local area network, wide area network, the Internet, or other network configuration.

As a server application, the application 130 may respond to communication initiated by the client devices 142. An example of such an application may be an email or messaging system that may store email messages in a database. Client devices 142 may access the email messages in the database by using a web browser, email client, or other client-based software. In another example, the application 130 may be a website that allows clients to access the website using a web browser.

When the application packages are used, a package generation system 144 may create an initial version of an application package. The package generation system 144 may have a hardware platform 146, which may include a processor, random access memory, local storage, and user and network interfaces, along with an operating system 148 on which various applications may operate.

A virtualization layer 150 may be used with a sequencer 152 to install and execute the application 154 to create an application package 156. In many embodiments, the application package 156 may include an application state 158, which may be an initial application state 158.

Figure 2:
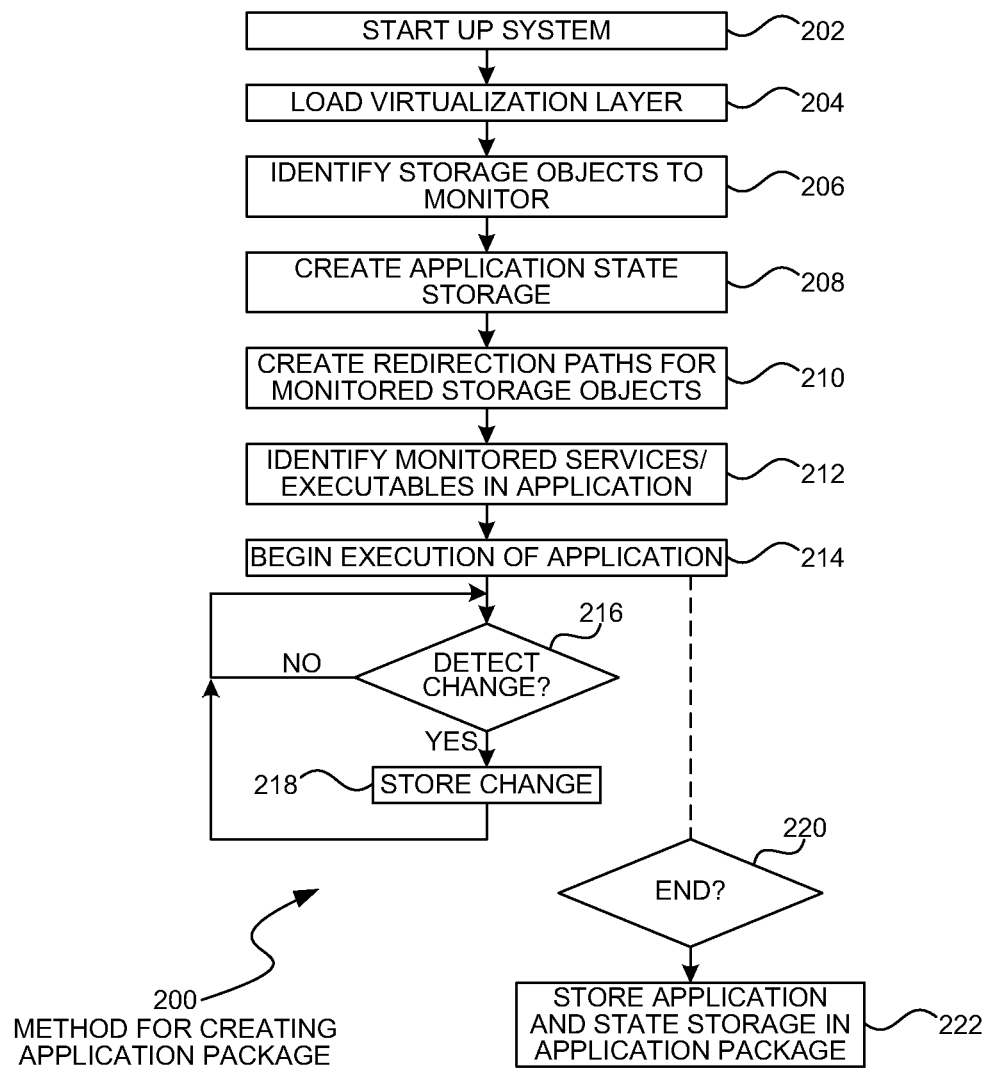
FIG. 2 is a flowchart illustration of an embodiment showing a method for creating an application package.

FIG. 2 is a flowchart illustration of an embodiment 200 showing a method for creating an application package. The process of embodiment 200 is a simplified example of how an application package may be created using a virtualization layer and prepared for execution.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a method for creating an application package. The application package may define an initial or baseline state for an application. In some embodiments, the application package may be installed and executed in a cloud process. Such embodiments may include a management application or script that may install a virtualization layer and load the application package for execution.

The application package may contain all of the executables called by an application, including libraries, assemblies, or various additional components, along with any application state stored by the application during installation or normal operation. The process of embodiment 200 may be performed to identify the various executables and to capture the state of the application during installation or normal operation. All of the components that are identified may be added to the package, and the package may be used to re-create the application at the state at which the process of embodiment 200 ends.

The operations of embodiment 200 may be those operations performed by the package generator system 114 and specifically by the sequencer 152 and virtualization layer 150.

The system may start up in block 202. A virtualization layer may be loaded in block 204.

Storage objects to monitor may be defined in block 206. The storage objects may be configuration files, configuration databases, registries, or other objects. The objects may be registered with the virtualization layer so that the virtualization layer may monitor those objects for changes and may save those changes in an application state storage system, which may be created in block 208. In some embodiments, the virtualization layer may monitor all objects in the system for changes. Other embodiments may monitor changes for specific processes.

Different embodiments may use different storage systems in which to store application state information. In one embodiment, an application or service may maintain a separate registry, database, configuration file, or other storage object and may respond to read and write requests for application state information. In some embodiments, such functions may be performed by a virtualization layer.

The virtualization layer may create redirection paths for the monitored storage objects in block 210. The redirection paths may redirect read and write calls that may be directed to the monitored storage objects to redirect to the application state storage objects.

Within the application, the services or executables that may create and consume the application state may be identified in block 212. In some embodiments, the services or executables may be individually identified before executing the application. In other embodiments, the services or executables may be identified after executing the application, and may be identified by those services or executables that are associated with the application and that read or write to the monitored objects.

The application may begin execution in block 214. In some embodiments, the application may begin an installation process. In other embodiments, the application may merely begin execution.

During execution or installation, a change to one of the monitored storage objects may be detected in block 216. When the change is detected in block 216, the change may be stored in block 218. In some embodiments, the operations of blocks 216 and 218 may be performed during an installation of the application and may generate an initial or golden state of the application.

At some point during execution, an end command may be received in block 220, after which the application and the state storage objects may be saved into an application package. In many embodiments, the executables and data files associated with the application may also be identified and stored in the application package.

Figure 3:
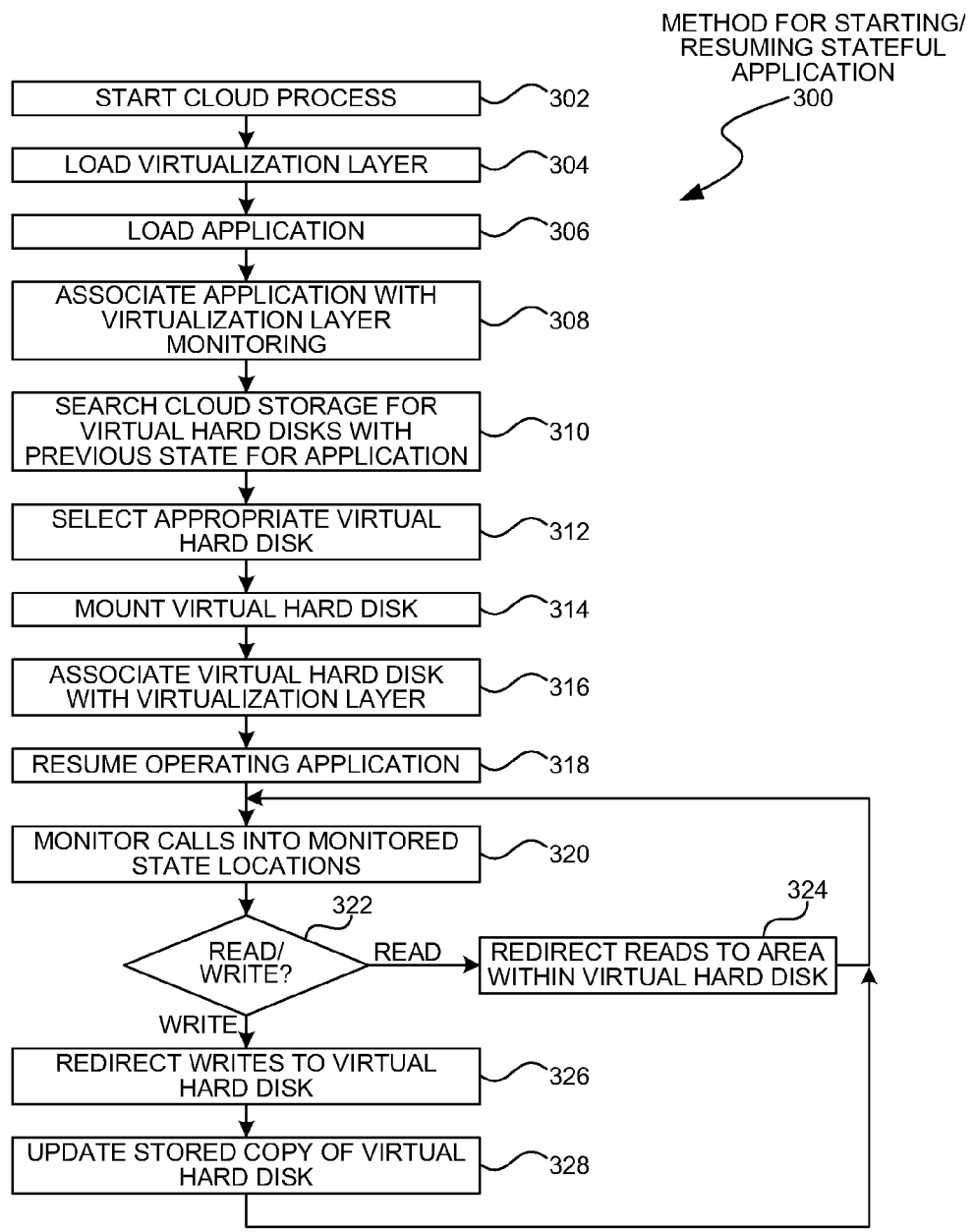
FIG. 3 is a flowchart illustration of an embodiment showing a method for starting or resuming a stateful application in a stateless process.

FIG. 3 is a flowchart illustration of an embodiment 300 showing a method for starting and resuming a stateful application within a stateless platform such as a stateless cloud platform The process of embodiment 300 is a simplified example of how an application may be started or resumed in a cloud computing environment. Within a cloud computing environment, an application executing on a stateless cloud computing platform may be paused and resumed as the cloud computing service provider may move the process to different hardware or software platforms in order to perform hardware or software maintenance, upgrade the hardware or software, or for managing the processes within a data center.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 represents a method that may be performed to load and execute a stateful application within a stateless process. A virtualization layer may be used to redirect read and write calls that may be associated with the application state.

The process of embodiment 300 may use a virtual hard disk that contains the application state. A virtual hard disk may be a software representation of a hard disk storage device. Virtual hard disks may be mounted and manipulated in similar manners as physical hard disk storage devices, but may be moved, replicated, backed up, and have other operations performed as if the virtual hard disk were a simple computer file.

In many embodiments, a virtual hard disk may be mounted and accessed over a network connection. In some such embodiments where the virtual hard disk may be accessed very frequently, the network connection may consume a large amount of bandwidth. Depending on the performance considerations of the network, including overall bandwidth and latency, some embodiments may move a virtual hard disk to a local storage device or to another storage device that may be nearby the local processor to maximize performance.

A cloud storage system, sometimes known as blob storage, may be used to store virtual hard disks that contain application state. In such embodiments, the virtual hard disk may be accessed through a network connection to the cloud storage system. In embodiments where the application state may be accessed frequently or where the latency or bandwidth of the network connection to the cloud storage system adversely affects performance, a copy of the application state may be placed on a local storage device for the cloud process executing the application. In such embodiments, the application state may be periodically synchronized with a virtual hard disk on a cloud storage system.

Embodiment 300 illustrates a method for starting or resuming a stateful application within a stateless platform such as a stateless cloud computing platform The process of embodiment 300 may be performed by a user when initially starting the application. In some cases, embodiment 300 may be performed by a cloud service provider when the cloud service provider halts and resumes the process to perform maintenance, adjust capacity, or for other reasons.

The cloud process may be started in block 302. The cloud process may be a stateless process where no system or application state may be stored or maintained.

A virtualization layer may be loaded in block 304. The virtualization layer may monitor calls to read and write to specific storage objects, such as configuration files, directories that include configuration information, configuration databases, registries, or other storage objects. The virtualization layer may redirect those calls into an application state storage object or set of storage objects that may be stored on a virtual hard disk.

After loading the virtualization layer in block 304, the application to be executed may be associated with the virtualization layer monitoring in block 306. The association mechanism may be different for various embodiments. In some embodiments, the virtualization layer may be associated with specific executables within the application for monitoring. In some embodiments, the virtualization layer may be associated with specific storage objects for monitoring.

In block 310, the cloud storage may be searched for virtual hard disks that may contain a previous state for the application. After selecting the appropriate virtual hard disk in block 312, the virtual hard disk may be mounted in block 314. In some embodiments, multiple virtual hard disks may be created for different versions of the application. For example, a nightly or weekly backup operation may create different versions of the application state.

In some embodiments, multiple instances of an application may be executing, each on a separate stateless thread. An example may be for an application that may be organized with a load balancing system where two, three, or even hundreds of instances of the application may be managed by a load balancing system to respond to large loads. In such an embodiment, each instance of the application may have an individual virtual hard disk that may contain the application state for the particular instance of the application.

In such an instance, the virtual hard disks that may contain application state may be placed in a pool of virtual hard disks. As the application load increases, a new stateless process may be created and one of the virtual hard disks from the pool may be selected and used to provide application state for the application instance. When the virtual hard disk is mounted in block 314, that virtual hard disk may be unavailable for other processes to mount.

Once the virtual hard disk is mounted in block 314, the virtual hard disk may be associated with the virtualization layer in block 316. The association of block 316 may involve identifying the application state storage objects on the virtual hard disk and registering those storage objects with the virtualization layer.

In some embodiments, the virtual hard disk may contain the application executable code, which may or may not be in the form of an application package. In some embodiments, the application executable or application package may be separately loaded.

When an application package is used, the application package may include an initial or 'golden' copy of the application state. As the application is used, the changes to the application state may be created and stored in a separate application state storage object. In such embodiments, a differencing mechanism may be used to keep the initial application state unchanged, but may apply the changes to the initial application state and store those changes in a second set of storage objects in the virtual hard disk.

The application may begin or resume operation in block 318.

During operation of the application, calls to the monitored state locations may be monitored in block 320. When a read operation may be encountered in block 322, the read operation may be redirected to the appropriate storage object within the virtual hard disk in block 324. In embodiments where a differencing mechanism may be employed and an initial version and a current version of the application state are separately stored, the differencing mechanism may determine which storage object to access to retrieve the requested state information.

When a write operation may be encountered in block 322, the write operation may be redirected to the appropriate storage object on the virtual hard disk in block 326. In embodiments where the application state has a copy stored locally, the stored copy of the application state on the virtual hard disk may be updated in block 328.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method, implemented at a computer system that includes one or more processors, for operating a stateful application in a stateless environment, the method comprising:
   starting a process that is stateless and that has a storage system associated therewith;
   using the stateless process to execute an application that has state, wherein an initial state of the application was previously stored in a first storage object in the storage system, and wherein the application is first executed using the initial state stored in the first storage object;
   registering the application with a virtualization layer of the computer system, wherein, upon completion of the registration, the virtualization layer is operable to monitor executable code that is associated with the application;
   capturing, by the virtualization layer, a change to the initial state of the application wherein the capture to the change to the initial state of the application includes the following:
      writing the change to the initial state of the application to a local storage area; and
      periodically copying data stored in the local storage area and then writing the copied data to a second storage object in the storage system rather than writing the copied data to the first storage object, wherein the data that was copied and written at least includes the change to the initial state of the application, and wherein the initial state stored in the first storage object remains unchanged,
   wherein, prior to executing the application, the computer system determines that the application has a network connection bandwidth that adversely impacts a performance of the application; and
   in response to determining that the network connection bandwidth adversely impacts the performance of the application, create a copy of the initial state of the application and store the copy on the local storage area.

2. The method of claim 1, wherein the stateless process operates on a virtual machine.

3. The method of claim 2, wherein the stateless process operates in a datacenter.

4. The method of claim 1, wherein the storage system that is associated with the stateless process comprises a virtual hard disk, and wherein the virtualization layer is configured to store the change to the initial state of the application on the virtual hard disk.

5. The method of claim 1, wherein the application is stored in a package.

6. The method of claim 5, wherein the package includes the change to the initial state of the application.

7. The method of claim 5, wherein the change to the initial state of the application is separate from the package.

8. The method of claim 1, wherein the method further comprises:
   detecting a condition in which a plurality of processes that are executing on hardware of the computer system are determined to be in a state of low usage, wherein the stateless process that is executing the application is included within the plurality of processes; and
   in response to detecting the condition, consolidating the plurality of processes such that the plurality of processes execute only on a subset of the hardware.

9. The method of claim 8, wherein the consolidation of the plurality of processes at least includes the following:
   storing a present state of the application on the storage system associated with the stateless process;
   pausing the execution of the application;
   pausing the stateless process;
   restarting the paused stateless process on the subset of the hardware; and
   restarting the paused application using the present state of the application that was previously stored on the storage system.

10. The method of claim 1, wherein the stateless process is executing a first instance of the application, and wherein a second stateless process having a different storage system associated therewith is executing a second instance of the application.

11. The method of claim 10, wherein both the storage system associated with the stateless process and the different storage system associated with the second stateless process are virtual hard disks, the virtual hard disk of the stateless process being independent and distinct from the virtual hard disk of the second stateless process.

12. The method of claim 11, wherein the virtual hard disk of the stateless process and the virtual hard disk of the second stateless process were selected from a pool of virtual hard disks.

13. A computer system, comprising:
   one or more processors; and
   one or more computer-readable hardware storage devices having stored thereon computer-executable instructions that are executable by the one or more processors to cause the computer system to operate a stateful application in a stateless environment by causing the computer system to:
   start a process that is stateless and that has a storage system associated therewith;
   use the stateless process to execute an application that has state, wherein an initial state of the application was previously stored in a first storage object in the storage system, and wherein the application is first executed using the initial state stored in the first storage object;
   register the application with a virtualization layer of the computer system, wherein, upon completion of the registration, the virtualization layer is operable to monitor executable code that is associated with the application;
   use the virtualization layer to capture a change to the initial state of the application, wherein the capture to the change to the initial state of the application includes the following:
      writing the change to the initial state of the application to a local storage area; and
      periodically copying data stored in the local storage area and then writing the copied data to a second storage object in the storage system rather than writing the copied data to the first storage object, wherein the data that was copied and written at least includes the change to the initial state of the application, and wherein the initial state stored in the first storage object remains unchanged,
   wherein, prior to executing the application, the computer system determines that the application has a network connection bandwidth that adversely impacts a performance of the application; and
   in response to determining that the network connection bandwidth adversely impacts the performance of the application, create a copy of the initial state of the application and store the copy on the local storage area.

14. The system of claim 13, wherein the computer-executable instructions further cause the computer system to create a virtual hard disk within the storage system that is associated with the stateless process.

15. The system of claim 14, wherein the computer-executable instructions further cause the computer system to:
store the virtual hard disk at a predefined interval to create a plurality of versions of the virtual hard disk.

16. The system of claim 13, wherein the system further comprises:
a sequencer that creates a package which includes both the application and the initial state of the application.

17. The system of claim 16, wherein the initial state includes operating system registry settings and at least one configuration file change.

18. One or more hardware storage devices having thereon computer-executable instructions that are executable by one or more processors of a computer system to cause the computer system to operate a stateful application in a stateless environment by at least causing the computer system to:
start a process that is stateless and that has a storage system associated therewith;
use the stateless process to execute an application that has state, wherein an initial state of the application was previously stored in a first storage object in the storage system, and wherein the application is first executed using the initial state stored in the first storage object;
register the application with a virtualization layer of the computer system, wherein, upon completion of the registration, the virtualization layer is operable to monitor executable code that is associated with the application;
use the virtualization layer to capture a change to the initial state of the application, wherein the capture to the change to the initial state of the application includes the following:
writing the change to the initial state of the application to a local storage area; and
periodically copying data stored in the local storage area and then writing the copied data to a second storage object in the storage system rather than writing the copied data to the first storage object, wherein the data that was copied and written at least includes the change to the initial state of the application, and wherein the initial state stored in the first storage object remains unchanged,
wherein, prior to executing the application, the computer system determines that the application has a network connection bandwidth that adversely impacts a performance of the application; and
in response to determining that the network connection bandwidth adversely impacts the performance of the application, create a copy of the initial state of the application and store the copy on the local storage area.

19. The one or more hardware storage devices of claim 18, wherein the use of the virtualization layer to capture the change to the initial state of the application includes the following:
capturing all read and write calls to areas where the state of the application is stored; and
redirecting the calls to a cloud storage system.

20. The one or more hardware storage devices of claim 19, wherein the change to the initial state of the application is also stored with the application in an application package.

* * * * *